(12) United States Patent
Nedzinskas

(10) Patent No.: US 11,196,719 B1
(45) Date of Patent: Dec. 7, 2021

(54) SYSTEM AND METHOD FOR BLURRING CONNECTION INFORMATION IN VIRTUAL PRIVATE NETWORKS

(71) Applicant: UAB 360 IT, Vilnius (LT)

(72) Inventor: Laimutis Nedzinskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/375,584

(22) Filed: Jul. 14, 2021

(51) Int. Cl.
*H04L 29/06* (2006.01)
*H04L 12/46* (2006.01)

(52) U.S. Cl.
CPC ...... *H04L 63/0428* (2013.01); *H04L 12/4641* (2013.01)

(58) Field of Classification Search
CPC ................. H04L 63/0428; H04L 12/4641
See application file for complete search history.

(56) References Cited

U.S. PATENT DOCUMENTS

2016/0308904 A1* 10/2016 Yoon ................... H04L 63/0272
2017/0070575 A1* 3/2017 Royal ..................... H04L 67/06

* cited by examiner

*Primary Examiner* — Arvin Eskandarnia
(74) *Attorney, Agent, or Firm* — Moser Taboada

(57) ABSTRACT

Systems and methods for blurring connection information in virtual private networks are provided herein. In some embodiments, a method of blurring VPN connection metadata may comprise: receiving, by a VPN service provider infrastructure, a request from a user device to establish a VPN connection with one or more VPN servers, wherein the VPN service provider infrastructure includes a logic engine configured to perform statistical blurring of VPN connection metadata; establishing a connection between the user device and one or more target sites during a VPN session; receiving, from the one or more VPN servers, VPN connection metadata associated with the user's VPN connections and a user identifier associated with the user; performing statistical blurring of VPN connection metadata by modifying the VPN connection metadata using an unknown random value to create blurred connection metadata; and storing the blurred connection metadata in association with the user identifier received.

20 Claims, 5 Drawing Sheets

SYSTEM AND METHOD FOR BLURRING CONNECTION INFORMATION IN VIRTUAL PRIVATE NETWORKS

FIELD

The present invention relates generally to virtual private networks (VPN), and more particularly to blurring connection information in a VPN.

BACKGROUND

Global Internet users increasingly rely on virtual private network (VPN) services to preserve their privacy, circumvent censorship, and access geo filtered content. Originally developed as a technology to privately send and receive data across public networks, VPNs are now used broadly as a privacy-preserving technology that allows Internet users to obscure not only their traffic but also their personal information, such as their web browsing history, from third parties including Internet service providers (ISPs) and Spyware, etc. A VPN service provider offers a secure private networking environment within a shared public insecure infrastructure through encapsulation and encryption of all traffic from the VPN application within the VPN user's device to the remote access VPN server.

Some information associated with user's use of the VPN services is stored for various operational and security reasons and to detect abuse of the VPN network. For example, user connection data, such as connection count per over a period of time or when a user becomes active after a period of inactivity, may be stored. It is possible for an adversary to extract or determine certain information about the user or the user's activities from this data. This type of information may be exploited and used to cause harm to the user, or negatively affect the user in some way.

Therefore, there is a need for improved methods and systems for obscuring users' information stored in association with their VPN usage to prevent others from making use of that data, if extracted.

SUMMARY

Systems and methods for blurring connection information in virtual private networks are provided herein. In some embodiments, a method of blurring virtual private network (VPN) connection metadata associated with a user may comprise: receiving, by a VPN service provider infrastructure, a request from a user device associated with the user to establish a VPN connection with one or more VPN servers, wherein the VPN service provider infrastructure includes a logic engine configured to perform statistical blurring of VPN connection metadata; establishing a connection between the user device and one or more target sites during a VPN session; receiving, from the one or more VPN servers, VPN connection metadata associated with the user's VPN connections and a user identifier associated with the user; performing statistical blurring of VPN connection metadata by modifying the VPN connection metadata using an unknown random value to create blurred connection metadata; and storing the blurred connection metadata in a user information database in association with the user identifier received.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
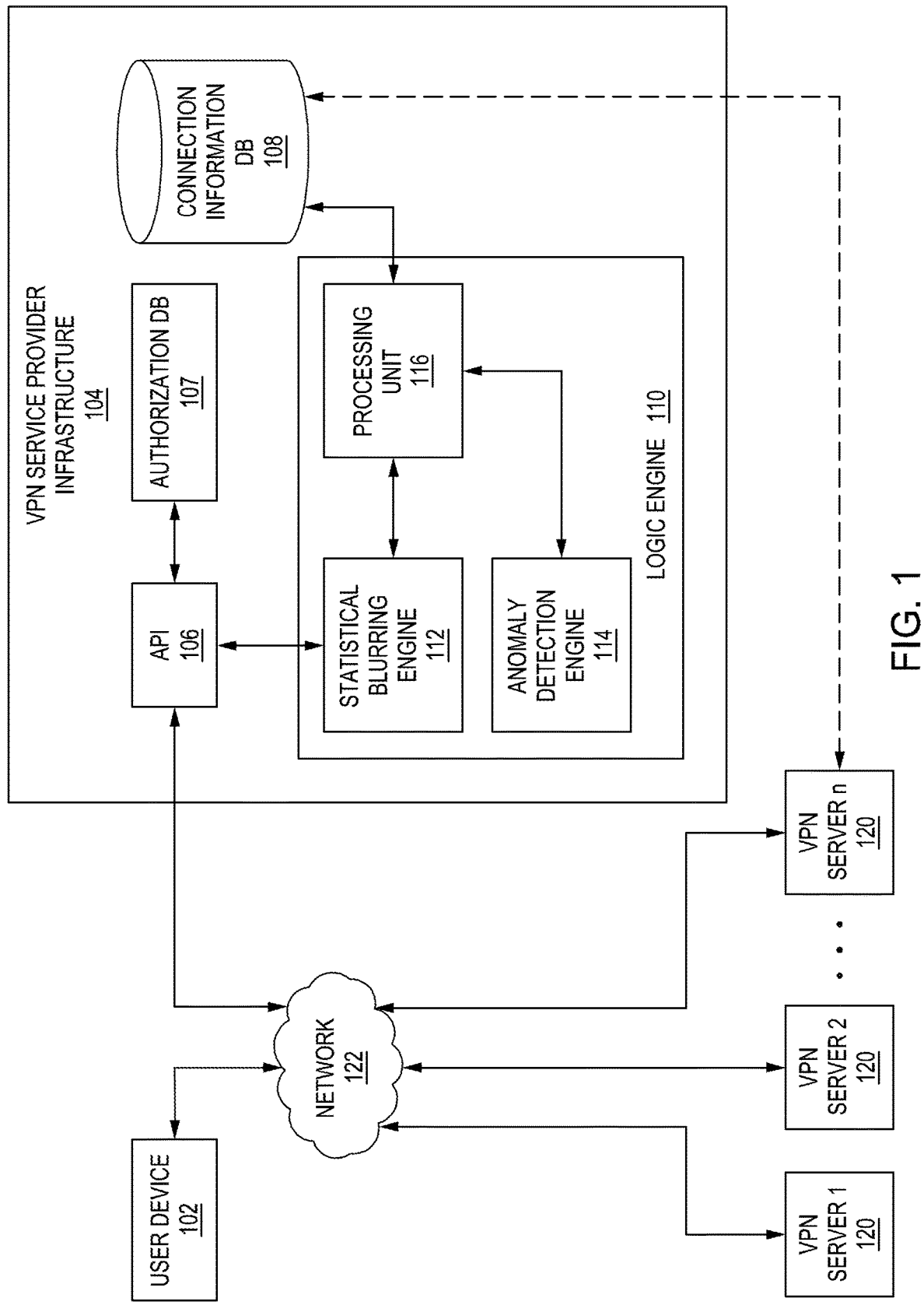
FIG. 1 depicts a high-level block diagram of a network architecture of a system for blurring connection information in virtual private networks in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for blurring connection information in a VPN. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the present invention obscures or blurs users' information stored in association with their VPN usage to prevent others from making use of that data, if extracted. In some embodiments, a user's data by introducing noise into the data such that false positives or inaccurate data would be extracted by an adversary, thus making the data extracted unusable, unreliable, or useless to the adversary. This is done while at the same time preserving the usefulness of the overall data to the VPN operator for detecting certain anomalies and deviations from the norm in order to identify security risks and detect and prevent abuse of the VPN network.

For example, in some embodiments, by adding a random positive value to the connection counter, so that the counter is never zero, an adversary would not have reliable data to be able to infer or determine the user's actual VPN activity. In some embodiments, the magnitude of the random value can be limited to a certain percentage of average connections values or to some constant value. In other embodiments, a piece of sensitive data may be the user's last connection time. In this case, for example, the value of last connection time is blurred by adding a random value which can also be negative. In some embodiments, the absolute magnitude of the value is again limited to some constant value. If this information is ever obtained or otherwise extracted by an adversary, it would create a plausible deniability that the information is accurate since the data includes noise and/or false positives. As used herein, an adversary is any party that extracts or otherwise obtains user data that was not originally intended for their use.

Thus, systems and methods consistent with embodiments of this present invention allows collecting and/or aggregating connection data without keeping individual and identifiable information. If an attacker/adversary would gain access to data, they could not determine identifiable information about user activity and inactivity. As used herein, an adversary is any party that extracts or otherwise obtains user data that was not originally intended for their use. Details of such systems and methods are described in detail below with respect to the figures.

FIG. 1 illustrates an example of a system 100 for blurring connection information in virtual private networks. The system comprises user device 102, which can be any computing or networking device having access to a particular network (e.g. Internet) and to a VPN application, a VPN Service Provider Infrastructure 104, plurality of VPN Servers 120. In some embodiments, user device 102 can be any computing device capable of hosting the VPN client application. User device 102 can comprise any device that is connected to a network, including, for example, a laptop, a mobile phone, a tablet computer, a desktop computer, a smart device, a router and other network devices. User Device 102 can also be a device that is capable of network connectivity, but not primarily intended for networking, such as connected home appliances, smart home security systems, autonomous farming equipment, wearable health monitors, smart factory equipment, wireless inventory trackers, biometric cybersecurity scanners, and others. VPN Service Provider Infrastructure 104—is a combination of hardware and software that provides functionality for multiple User Devices 102 via the Network 122.

VPN Service Provider Infrastructure 104 can receive from the User Device 102 the request to establish a VPN connection. The VPN Service Provider Infrastructure 104 also contains databases, which will persistently store and contain all of the data necessary for servicing the VPN client and also stores VPN connection data for purposes of detecting connection and usage anomalies and security threats. VPN service Provider Infrastructure 104 can be a combination of physical devices, virtual machines/servers, or can be located on the cloud. The VPN Service Provider Infrastructure 104 consists of the following components: API 106, User Authorization Database 107, Connection Information Database 108 and Logic Engine 110. The Logic Engine 110 in turn consist of the following components: Statistical Blurring Engine 112, Anomaly Detection Engine 114, and Processing Unit 116. While the elements shown in FIG. 1 implement the exemplary embodiment, some elements in other embodiments can have different titles or can be combined into a single element instead of two separate elements (for example, Statistical Blurring Engine 112, Anomaly Detection Engine 114, and/or Processing Unit 116 can be combined into a single hardware, software infrastructure to form a single logical unit. However, the functionality of elements and the flow of information between the elements is not impacted generally by such consolidations or combinations. Therefore, FIG. 1 as shown should be exemplary only, and not restrictive or exclusionary of other features, including features discussed in other areas of this disclosure here within.

API 106 is a programming interface consisting of one or more endpoints to a defined request-response message system. In simple terms, API 106 is the interface between the User Device 102 and the VPN Service Provider Infrastructure 104. API 106 is capable of handling the authentication requests from the User Device 102 and also mediating the requests for establishing a VPN connection. It can also send a database query to the User Authorization Database 107 in order to authenticate the User Device 102. API 106 can be operating on any hardware or can be based on cloud. User Authorization Database 107 is a component of the VPN Service Provider Infrastructure 104 and a structured repository of authentication credentials belonging to the users/ owners of User Devices 102. User Authorization Database 107 is used in verifying the credentials of the owner of the User Device 102 and allowing the User Device 102 to connect with the VPN Service Provider Infrastructure 104.

Connection Information Database 108 is a component of the VPN Service Provider Infrastructure 104 and a structured repository of VPN connection information associated with each of the users/owners of User Devices 102. It stores user related data in tables (named columns and multiple rows), where there is information included regarding VPN connection information of the owner of User Device 102. Connection Information Database 108 can be populated with various types of VPN usage information associated the user's VPN usage. Connection Information Database 108 can be any physical storage device or a cloud based storage. The Connection Information Database 108 can be conventional databases offered by MySQL, MSSQL, NoSQL, object-oriented databases, or any other type or category of databases. The Connection Information Database 108 is responsible for storing, and returning user's VPN connection and usage information of User Device 102 accessing the VPN Service Provider Infrastructure 104.

Logic Engine 110 a logical unit and a constituent of the VPN Service Provider Infrastructure 104 that is configured to perform complex operations of blurring VPN connection metadata using Statistical Blurring Engine 112 and detecting anomalies and security risks associated with users' VPN connections using Anomaly Detection Engine 114. In some embodiments, Logic Engine 110 can be a combination of software and hardware present within or in combination with the VPN Service Provider Infrastructure 104 but the direction of interactions with VPN Service Provider Infrastructure 104 and its constituents remains unchanged. The Statistical Blurring Engine 112 and Anomaly Detection Engine 114 are components within or in combination with the Logic Engine 110 that is configured to manage, perform arithmetical and logical operations for blurring VPN connection metadata and detecting anomalies and security risks associated with users' VPN connections, respectively. In some embodiments, the Logic Engine further includes a Processing Unit 116 which can be a combination of software and hardware and is capable of processing instructions received by the Statistical Blurring Engine 112 and Anomaly Detection Engine 114, such as communications with the Connection Information Database 108 and API 106.

VPN Servers; VPN Server 1; VPN Server 2; VPN Server n 120—are exemplary instances of the plurality of VPN Servers. Here, VPN is an acronym for virtual private network. The number of servers in the plurality of VPN Servers 120 are not limited and depend on the VPN network provider's infrastructure. A VPN Server is a physical or virtual server that is provisioned to host and deliver VPN Services to multiple User Devices 102 worldwide. Each of the servers in the plurality of VPN Servers 120 is a combination of VPN hardware and VPN software that allows a VPN client installed on the User Device 102 to connect to one or more secure virtual private networks. VPN Servers 120 usually contains more logical and physical communication ports.

All the mentioned components of the embodiments have access to Network 122 and are able to interact with each other through the same. Here, Network 122 can be any digital telecommunication network that permits several nodes to share and access resources, e.g. local-area network (LAN), wide-area networks (WANs), campus-area networks (CANs), metropolitan-area networks (MANs), home-area networks (HANs), Intranet, Extranet, Internetwork, Internet.

In FIG. 1, all occurrences of communication between the User Device 102, VPN Service Provider infrastructure 104 and the plurality of VPN servers 120 occur through the Network 122. The instances of communication between User Device 102 and VPN Service Provider Infrastructure 104 include but are not limited to authentication, authorization, data exchange, etc. The communication instances between User Device 102 and the plurality of VPN Servers 120 can happen through an encrypted tunneling protocol provided by the VPN application installed on the User Device 102. The tunneling protocols can include but are not limited to PPTP, SSTP, L2TP/IPSec, OpenVPN, SSTP, IKEv2, SSL/TLS, Wireguard.

Figure 2:
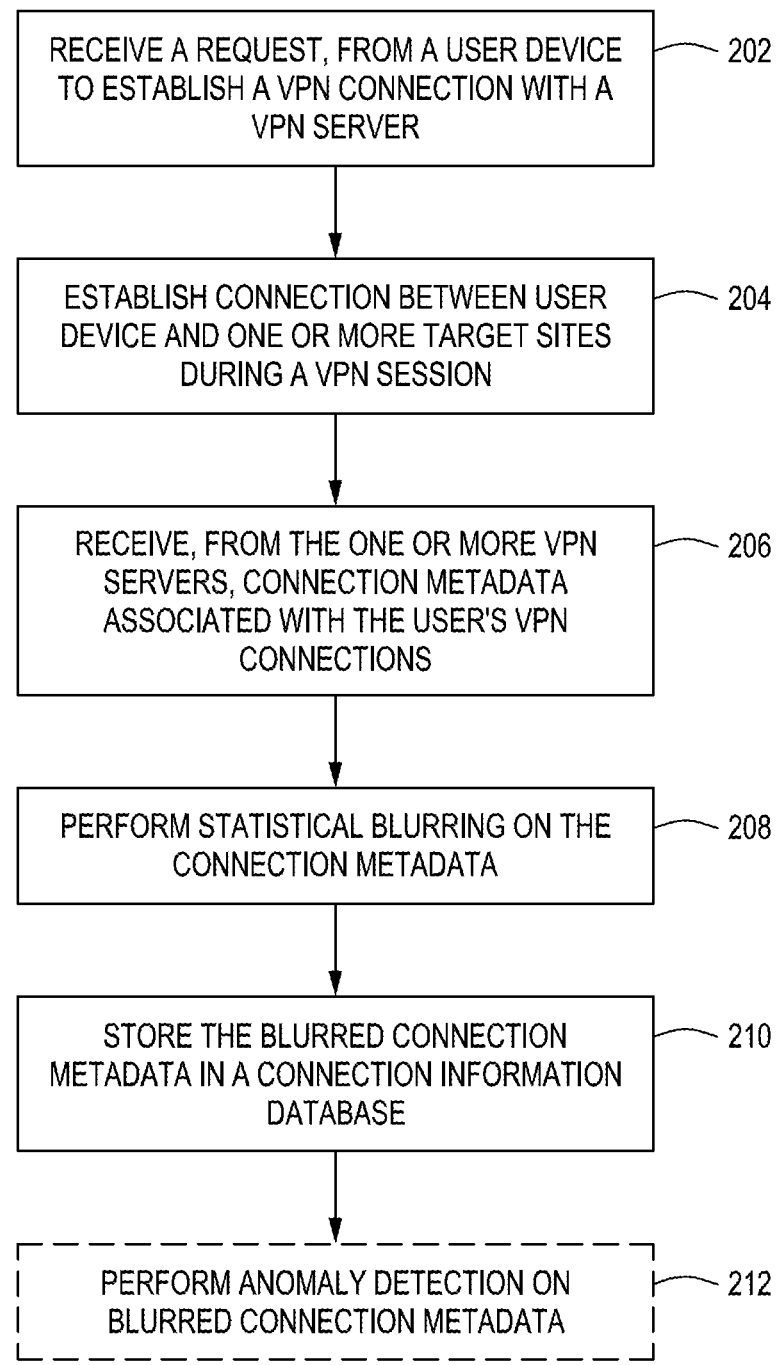
FIG. 2 depicts a flow diagram of a method for blurring connection information in virtual private networks, in accordance with an embodiment of the present principles.

FIG. 2 illustrates an example flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is an example process 200 a flow diagram of a method for blurring connection information in virtual private networks, in accordance with an embodiment of the present principles. In some embodiments, process 200 may be performed by the VPN Service Provider Infrastructure 104. In other embodiments, process 200 may be performed by one or more VPN Servers 120, or by a combination of the VPN Service Provider Infrastructure 104 and one or more VPN Servers 120. Such a process 200 may begin at 202 by receiving, by the VPN Service Provider Infrastructure 104, a connection request, from a User Device 102, to establish a VPN connection with one or more VPN servers 120. In particular, the request is received by API 106 which handles authentication requests from the User Device 102 and also mediates the requests for establishing a VPN connection.

Once the VPN connection between the User Device 102 and the VPN Server 120 is established, the user (i.e., User Device 102) connects to one or more target sites on Network 122 during a VPN session at 204. In some embodiments, connection metadata associated with the user's VPN session(s) is identified by the VPN server 120 and sent to the VPN Service Provider Infrastructure 104 via API 106 to be stored in Connection Information Database 108. The connection metadata is received along with a user identifier that identifies the user of User Device 102.

In some embodiments, the VPN connection metadata may include, but is not limited to, one or more of the following: connection count per time period, number of connections, total number of connection attempts, number of invalid connection attempts, number of distinct user connections over a discrete time period, connection timestamps and in particular a user's last connection timestamp, the country of origin and destination country associated with the user's VPN connection, the connection protocol used, a user's authentication status (i.e., does the user have a paid subscription or is it a new user), connection bandwidth information, connection latencies, connection maximum or average, amount of data uploaded or downloaded during the VPN session, and the like.

Before being stored in Connection Information Database 108, the connection metadata associated with the user's VPN session(s) and the user identifier is sent to, and received by the Logic Engine 110 to be processed at 206. As noted above, in some embodiments the connection metadata associated with the user's VPN session(s) is identified by and sent by the VPN server 120. In other embodiments, the above VPN connection metadata may be identified by the User Device 102 or may be extracted directly by API 106 during the connection requests/attempts to be sent to Logic Engine 110 for processing before being stored in Connection Information Database 108.

The Logic Engine 110 employs a Statistical Blurring Engine 112 to blur/obscure the user's VPN connection metadata at 208. Various methods may be used for blurring/obscuring the VPN connection metadata, some of which are described in further detail with respect to FIGS. 3 and 4 below.

At 210, the blurred connection metadata is stored in Connection Information Database 108. The blurred connection metadata is stored in association with a user identifier. In some embodiments, all the connection metadata transmitted and stored may be encrypted during transmission and/or in Connection Information Database 108.

In some embodiments, the process 200 may optionally perform anomaly detection at 212, by the Anomaly Detection Engine 114, on the blurred connection metadata stored in Connection Information Database 108 if requested via the API 106. Specifically, the reason the blurred VPN connection information is still useful to the VPN system operators is that the connection information stored is used for anomaly detection, fraud detection and security threats. The accuracy of a user's specific connection metadata is not of concern to the VPN system operators. Rather, it is anomalies or large differences from a baseline usage of a user that can be derived from a statistical analysis performed on the connection metadata by the Anomaly Detection Engine 114 that is of importance. Thus, the random values added to the actual connection data are limited so they don't show up as an anomaly (i.e., the system does not want to add 100's of connections to a connection count to blur the data as it would show up as a usage anomaly that must be investigated. Rather, for statistical purposes, it's enough to introduce a certain percentage of false positives (e.g., 1% to 3% of false positives) in the data that is acceptable. In some embodiments, the Statistical Blurring Engine 112 may introduce blurred connection metadata that produces about 2% of false positives to obscure or blur the connection metadata when the connection metadata is queried/extracted. Thus, user anonymity can be introduced by adding this bounded randomized noise to the connection metadata, without impairing the ability of the VPN system operators from tracking larger anomalies.

Figure 3:
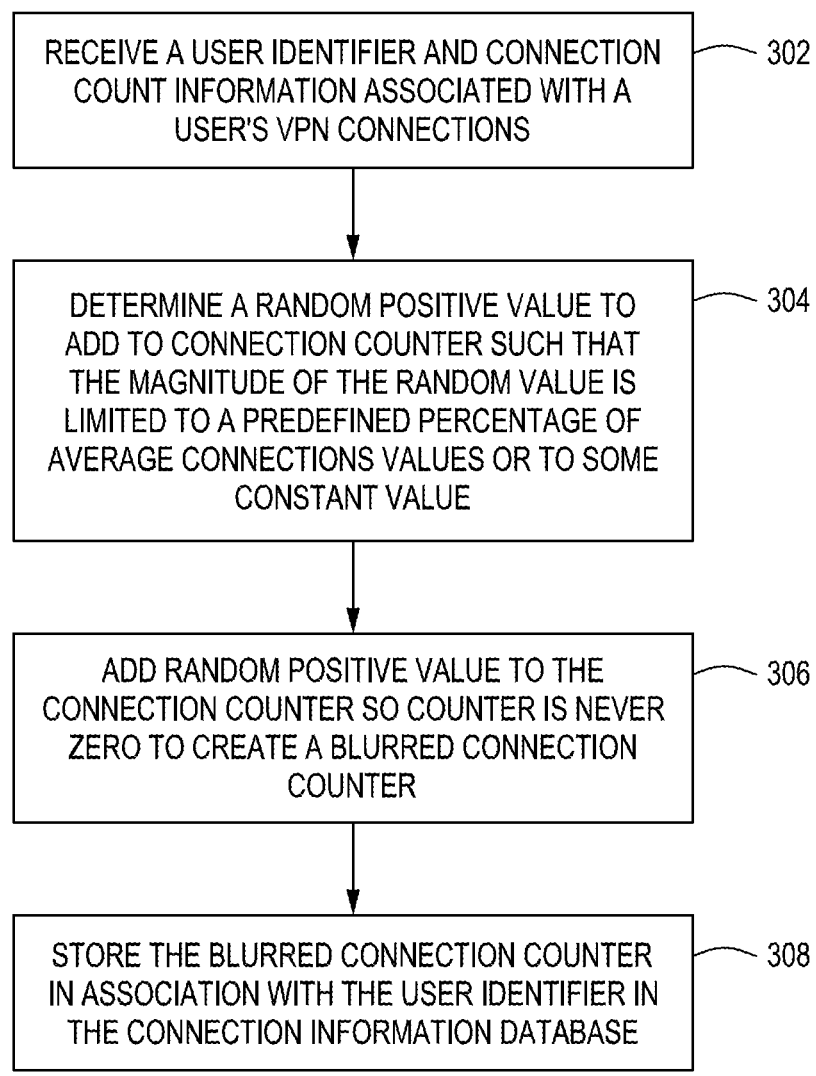
FIG. 3 depicts flow diagram of a method for blurring connection count information in virtual private networks, in accordance with an embodiment of the present principles.

FIG. 3 depicts a flow diagram of a method 300 for blurring connection count information (i.e., blurred connection metadata) in a virtual private network. The method begins 302 where the Logic Engine receives a user identifier that identifies a user of User Device 102 and connection count information (also referred to as a connection counter) that keeps track of the number of VPN connections made by the user.

At 304, the Statistical Blurring Engine 112 of the Logic Engine 110 determines a random positive value to add to the connection counter. In some embodiments, the range of the magnitude of the random value is configurable. For example, it can be limited to a certain percentage of average connections values, or to some constant value, so the counter is never zero. In other embodiments, instead of a random value, any type of unknown positive number may be added that obscures the connection count and makes it an inaccurate representation of the number of connections may be added. For example, the number added to the connection count can include an average value, a medium quartile value that is in the first, second, third and fourth quartile, a partly random value in the range of 20% of the average number of connections, or the like.

At 306, the random positive value, or other value as described above, is added to the connection counter is never zero to create a blurred connection counter (i.e., blurred connection metadata).

At 308, the blurred connection count information is then stored in Connection Information Database 108 in association with the user identifier received/retrieved.

Figure 4:
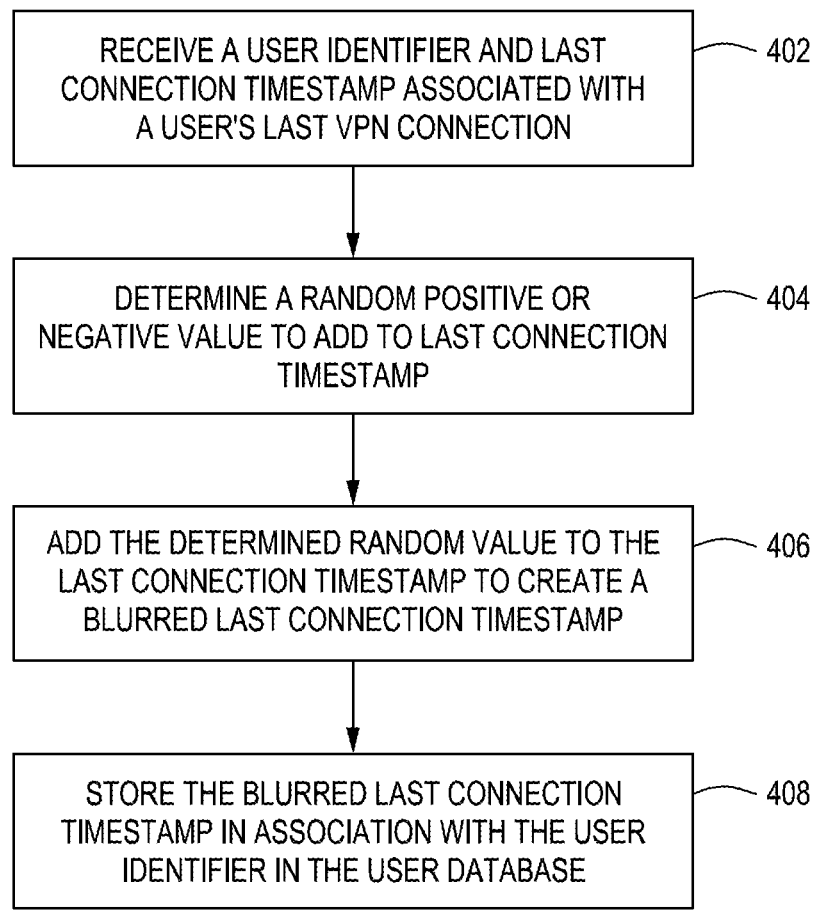
FIG. 4 depicts another flow diagram of a method for blurring last connection timestamp in virtual private networks, in accordance with an embodiment of the present principles.

FIG. 4 depicts a flow diagram of a method 400 for blurring VPN last connection timestamp information (i.e., blurred connection metadata) in a virtual private network. The method begins 402 where the Logic Engine receives a user identifier that identifies a user of User Device 102 and last connection timestamp information the keeps track of the last time the user established, or attempted to establish, a VPN connection.

At 404, the Statistical Blurring Engine 112 of the Logic Engine 110 determines a random positive or negative value to add to the last connection timestamp. In this case, the value can be negative since the absolute magnitude of the value is again limited to some constant value. In some embodiments, the range of the magnitude of the random value is configurable as described with respect to connection count information.

At 406, the random value, or other value as described above, is added to the last connection timestamp to create a blurred last connection timestamp (i.e., blurred connection metadata). At 408, the blurred last connection timestamp is then stored in Connection Information Database 108 in association with the user identifier received/retrieved.

Although FIGS. 3 and 4 specifically focus on blurring connection count and last connection timestamp, similar techniques can be applied to all types of connection metadata including, but not limited to, number of distinct user connections over a discrete time period, connection count per time period, total number of connection attempts, number of invalid connection attempts, connection timestamps and in particular a user's last connection timestamp, the country of origin and destination country associated with the user's VPN connection, the connection protocol used, a user's authentication status (i.e., does the user have a paid subscription or is it a new user), connection bandwidth information, connection latencies, connection maximum or average, amount of data uploaded or downloaded during the VPN session, and the like.

Figure 5:
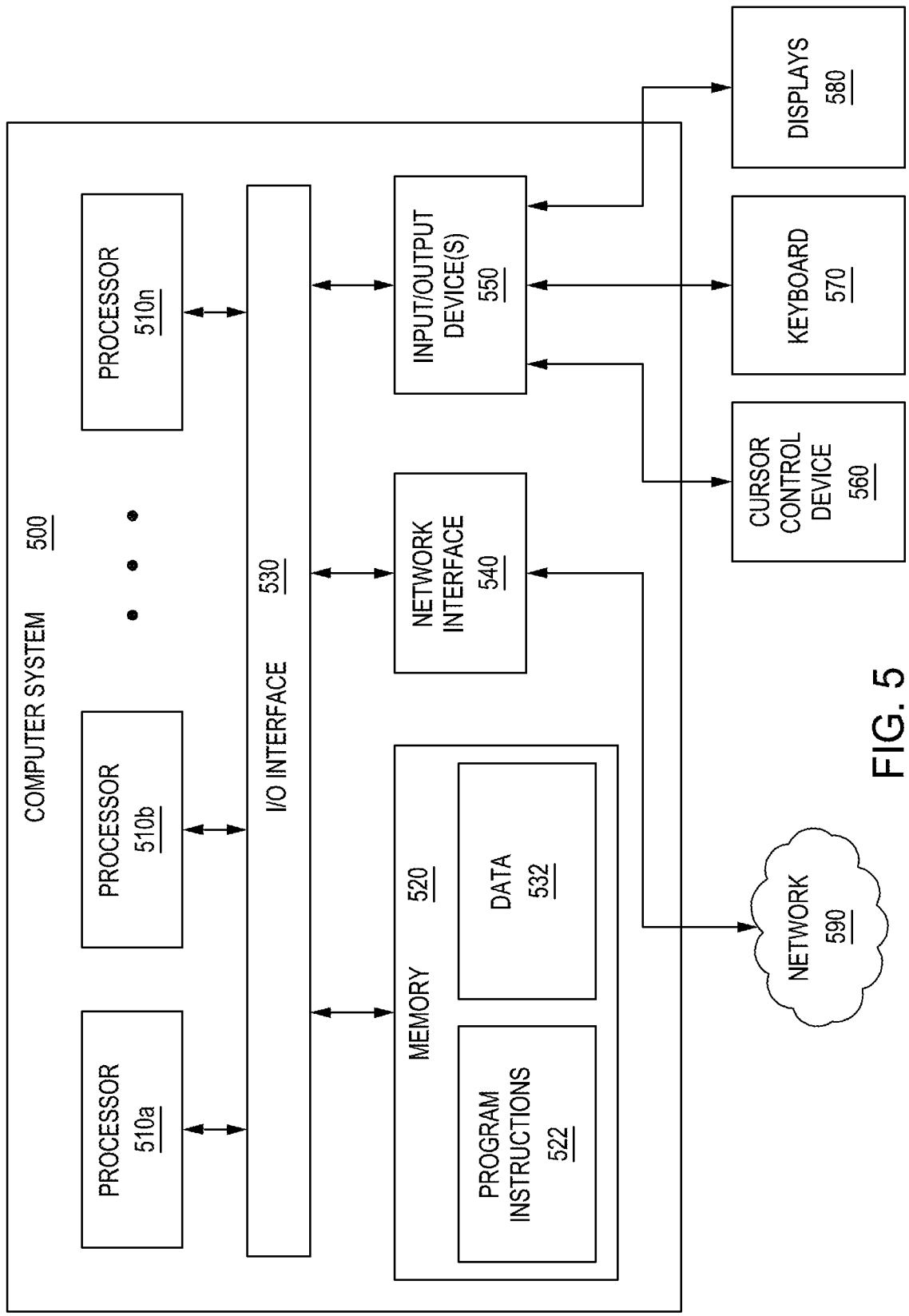
FIG. 5 depicts a high-level block diagram of a computing device suitable for use with embodiments of a sensitive dataflow tracking system in accordance with the present principles.

FIG. 5 depicts a computer system 500 that can be utilized in various embodiments of the present invention to implement the computer and/or the display, according to one or more embodiments.

Various embodiments of method and system for blurring connection information in virtual private networks, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement the methods 200, 300 and 400 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowchart of FIGS. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into submodules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Example Clauses

A. A method of blurring virtual private network (VPN) connection metadata associated with a user may comprise: receiving, by a VPN service provider infrastructure, a request from a user device associated with the user to establish a VPN connection with one or more VPN servers, wherein the VPN service provider infrastructure includes a logic engine configured to perform statistical blurring of VPN connection metadata; establishing a connection between the user device and one or more target sites during a VPN session; receiving, from the one or more VPN servers, VPN connection metadata associated with the user's VPN connections and a user identifier associated with the user; performing statistical blurring of VPN connection metadata by modifying the VPN connection metadata using an unknown random value to create blurred connection metadata; and storing the blurred connection metadata in a user information database in association with the user identifier received.

B. The method described in clause A, wherein the connection metadata includes at least one of connection count, last connection timestamp, connection count per time period, number of connection attempts, number of invalid connection attempts, number of distinct user connections over a discrete time period, connection timestamps, a country of origin and destination country associated with the user's VPN connection, a connection protocol used, a user's authentication status, connection bandwidth information, connection latencies, connection maximum or average, or an amount of data uploaded or downloaded during the VPN session.

C. The method described in clause A or B, wherein the unknown random value used is a positive or negative random value added to the actual VPN connection metadata to create the blurred connection metadata.

D. The method described in clauses A-C, wherein the unknown random value used to create the blurred connection metadata introduces a false positive rate of about 1% to about 3% when the connection metadata is queried or extracted.

E. The method described in clauses A-D, wherein the connection metadata that is blurred is a connection count.

F. The method described in clauses A-E, wherein the unknown random value is a random positive value that is added to the connection count such that the magnitude of the random value is limited to a predefined percentage of average connections values or to a constant value.

G. The method described in clauses A-F, wherein the random positive value added to the connection count to create the blurred connection metadata causes the connection count to never be zero.

H. The method described in clauses A-G, wherein the connection metadata that is blurred is the users last VPN connection timestamp.

I. The method described in clauses A-H, wherein the unknown random value is a random positive or negative value that is added to the last VPN connection timestamp such that the magnitude of the random value is limited to a predefined range.

What is claimed is:

1. A method of blurring virtual private network (VPN) connection metadata associated with a user, the method comprising:
   receiving, by a VPN service provider infrastructure, a request from a user device associated with the user to establish a VPN connection with one or more VPN servers, wherein the VPN service provider infrastructure includes a logic engine configured to perform statistical blurring of VPN connection metadata;
   establishing a connection between the user device and one or more VPN servers and/or target sites during a VPN session;
   receiving, from the one or more VPN servers, VPN connection metadata associated with the user's VPN connections and a user identifier associated with the user;
   performing statistical blurring of VPN connection metadata by modifying the VPN connection metadata using an unknown random value to create blurred connection metadata; and storing the blurred connection metadata in a user information database in association with the user identifier received.

2. The method of claim 1, wherein the connection metadata includes at least one of connection count, last connection timestamp, connection count per time period, number of connection attempts, number of invalid connection attempts, number of distinct user connections over a discrete time period, connection timestamps, a country of origin and destination country associated with the user's VPN connection, a connection protocol used, a user's authentication status, connection bandwidth information, connection latencies, connection maximum or average, or an amount of data uploaded or downloaded during the VPN session.

3. The method of claim 1, wherein the unknown random value used is a positive or negative random value added to the actual VPN connection metadata to create the blurred connection metadata.

4. The method of claim 1, wherein the unknown random value used to create the blurred connection metadata introduces a false positive rate of about 1% to about 3% when the connection metadata is queried or extracted.

5. The method of claim 1, wherein the connection metadata that is blurred is a connection count.

6. The method of claim 5, wherein the unknown random value is a random positive value that is added to the connection count such that the magnitude of the random value is limited to a predefined percentage of average connections values or to a constant value.

7. The method of claim 6, wherein the random positive value added to the connection count to create the blurred connection metadata causes the connection count to never be zero.

8. The method of claim 1, wherein the connection metadata that is blurred is the users last VPN connection timestamp.

9. The method of claim 8, wherein the unknown random value is a random positive or negative value that is added to the last VPN connection timestamp such that the magnitude of the random value is limited to a predefined range.

10. A system of blurring virtual private network (VPN) connection metadata associated with a user, the system comprising:
one or more processors; and
one or more non-transitory computer readable media having instructions stored thereon which, when executed by the one or more processors cause the one or more processors to perform operations comprising:
receiving, by a VPN service provider infrastructure, a request from a user device associated with the user to establish a VPN connection with one or more VPN servers, wherein the VPN service provider infrastructure includes a logic engine configured to perform statistical blurring of VPN connection metadata;
establishing a connection between the user device and one or more VPN servers and/or target sites during a VPN session;
receiving, from the one or more VPN servers, VPN connection metadata associated with the user's VPN connections and a user identifier associated with the user;
performing statistical blurring of VPN connection metadata by modifying the VPN connection metadata using an unknown random value to create blurred connection metadata; and storing the blurred connection metadata in a user information database in association with the user identifier received.

11. The system of claim 10, wherein the connection metadata includes at least one of connection count, last connection timestamp, connection count per time period, number of connection attempts, number of invalid connection attempts, number of distinct user connections over a discrete time period, connection timestamps, a country of origin and destination country associated with the user's VPN connection, a connection protocol used, a user's authentication status, connection bandwidth information, connection latencies, connection maximum or average, or an amount of data uploaded or downloaded during the VPN session.

12. The system of claim 10, wherein the unknown random value used is a positive or negative random value added to the actual VPN connection metadata to create the blurred connection metadata.

13. The system of claim 10, wherein the unknown random value used to create the blurred connection metadata introduces a false positive rate of about 1% to about 3% when the connection metadata is queried or extracted.

14. The system of claim 10, wherein the connection metadata that is blurred is a connection count.

15. The system of claim 14, wherein the unknown random value is a random positive value that is added to the connection count such that the magnitude of the random value is limited to a predefined percentage of average connections values or to a constant value.

16. The system of claim 15, wherein the random positive value added to the connection count to create the blurred connection metadata causes the connection count to never be zero.

17. The system of claim 10, wherein the connection metadata that is blurred is the users last VPN connection timestamp.

18. The system of claim 17, wherein the unknown random value is a random positive or negative value that is added to the last VPN connection timestamp such that the magnitude of the random value is limited to a predefined range.

19. A method of blurring virtual private network (VPN) metadata associated with a user, the method comprising:
receiving, by a VPN service provider infrastructure, a request from a user device associated with the user to establish a VPN connection with one or more VPN servers, wherein the VPN service provider infrastructure includes a logic engine configured to perform statistical blurring of VPN connection metadata;
attempting to establish a connection between the user device and one or more VPN servers;
receiving, from the one or more VPN servers, VPN metadata associated with the user's VPN connections and/or attempted connections, and a user identifier associated with the user;
performing statistical blurring of VPN metadata by modifying the VPN metadata using an unknown random value to create blurred VPN metadata; and
storing the blurred VPN metadata in a user information database in association with the user identifier received.

20. The method of claim 1, wherein the VPN metadata includes at least one of user authorizations, connection count, last connection timestamp, connection count per time period, number of connection attempts, number of invalid connection attempts, number of distinct user connections over a discrete time period, connection timestamps, a country of origin and destination country associated with the user's VPN connection, a connection protocol used, a user's authentication status, connection bandwidth information, connection latencies, connection maximum or average, or an amount of data uploaded or downloaded during a VPN session.

\* \* \* \* \*